United States Patent
Gahner

(10) Patent No.: US 11,380,981 B2
(45) Date of Patent: Jul. 5, 2022

(54) MOTOR VEHICLE ROOF ANTENNA WITH EXTERNAL MICROPHONE AND OPERATING METHOD THEREOF

(71) Applicant: AUDI AG, Ingolstadt (DE)

(72) Inventor: Enrico Gahner, Vohburg a.D. (DE)

(73) Assignee: Audi AG, Ingolstadt (DE)

( * ) Notice: Subject to any disclaimer, the term of this patent is extended or adjusted under 35 U.S.C. 154(b) by 270 days.

(21) Appl. No.: 16/757,143

(22) PCT Filed: Apr. 30, 2019

(86) PCT No.: PCT/EP2019/061121
§ 371 (c)(1),
(2) Date: Apr. 17, 2020

(87) PCT Pub. No.: WO2019/233681
PCT Pub. Date: Dec. 12, 2019

(65) Prior Publication Data
US 2020/0343627 A1    Oct. 29, 2020

(30) Foreign Application Priority Data

Jun. 5, 2018   (DE) ...................... 10 2018 208 776.8

(51) Int. Cl.
*H01Q 1/32* (2006.01)
*B60R 11/02* (2006.01)
(Continued)

(52) U.S. Cl.
CPC ....... *H01Q 1/3275* (2013.01); *B60R 11/0247* (2013.01); *H04R 1/086* (2013.01); *B60R 2011/004* (2013.01); *H04R 2499/13* (2013.01)

(58) Field of Classification Search
CPC ... H01Q 1/3275; B60R 11/02; B60R 11/0247; B60R 2011/004; B60R 2011/0028; B60R 2011/0043; H04R 1/086; H04R 2499/13
See application file for complete search history.

(56) References Cited

U.S. PATENT DOCUMENTS 7,058,193 B2   6/2006 Lane
9,396,718 B2   7/2016 Paul et al.

FOREIGN PATENT DOCUMENTS

CN   103574879 A      2/2014
DE   10038803 A1 *    2/2002   ............. B60R 25/25
(Continued)

OTHER PUBLICATIONS

International Preliminary Report on Patentability directed to related International Patent Application No. PCT/EP2019/061121, completed Feb. 6, 2020, with attached English-language translation; 13 pages.

(Continued)

*Primary Examiner* — Yogeshkumar Patel
(74) *Attorney, Agent, or Firm* — Sterne, Kessler, Goldstein & Fox P.L.L.C.

(57) ABSTRACT

The present disclosure relates to a motor vehicle external microphone having at least one microphone unit which has a microphone capsule arranged in a microphone housing, wherein the microphone housing has at least one microphone opening, through which an acoustic channel is formed between the at least one microphone opening and the microphone capsule, wherein the motor vehicle external microphone comprises a changeover device, which is designed to open the at least one microphone opening in an activated state of the motor vehicle external microphone and to close the same in a deactivated state of the motor vehicle exterior microphone. The invention also relates to a motor vehicle roof antenna and to a motor vehicle having such a motor vehicle external microphone. Finally, the invention relates to a method for operating such a motor vehicle external microphone.

13 Claims, 2 Drawing Sheets

(51) Int. Cl.
*H04R 1/08* (2006.01)
*B60R 11/00* (2006.01)

(56) References Cited

FOREIGN PATENT DOCUMENTS

| | | | |
|---|---|---|---|
| DE | 10038803 | A1 | 2/2002 |
| DE | 10203599 | A1 | 8/2003 |
| DE | 102014225397 | A1 | 6/2015 |
| DE | 102014225803 | A1 * | 6/2016 |
| DE | 102014225803 | A1 | 6/2016 |
| DE | 102017218542 | A1 | 8/2018 |
| DE | 102018202098 | B3 | 12/2018 |
| GB | 2521274 | B | 7/2018 |
| JP | 2007235316 | A * | 9/2007 |
| JP | 2007235316 | A | 9/2007 |
| JP | 2014216896 | A | 11/2014 |

OTHER PUBLICATIONS

International Search Report and Written Opinion of the International Searching Authority directed to related International Patent Application No. PCT/EP2019/061121, with certified English-language translation of Written Opinion, dated Jun. 6, 2019; 17 pages.

* cited by examiner

MOTOR VEHICLE ROOF ANTENNA WITH EXTERNAL MICROPHONE AND OPERATING METHOD THEREOF

TECHNICAL FIELD

The present disclosure relates to a motor vehicle external microphone having at least one microphone unit which has a microphone capsule arranged in a microphone housing, wherein the microphone housing has at least one microphone opening, through which an acoustic channel is formed between the at least one microphone opening and the microphone capsule. It also relates to a motor vehicle roof antenna and a motor vehicle with at least one such motor vehicle external microphone. Finally, the disclosure relates to a method for operating a motor vehicle external microphone.

BACKGROUND

In this context, DE 102 03 599 A1 discloses a microphone assembly for a vehicle hands-free device, the microphone assembly comprising a microphone unit which can be reversibly moved between a retracted and an extended position. The microphone assembly is arranged in the vehicle interior, in particular in an indentation of a headlining.

A system for opening a motor vehicle is known from DE 100 38 803 A1. The system comprises a microphone, which is arranged on a vehicle exterior structure and is used to receive a voice input. In one embodiment, two microphones are arranged in a motor vehicle emblem. Alternatively or additionally, two microphones are integrated in the rear lights of the motor vehicle.

DE 10 2014 225 397 A1 relates to the detection of an ambulance with a digital image sensor by a vehicle. A microphone, which is arranged outside the vehicle, is used to identify the ambulance.

With the motor vehicle external microphones known from the prior art, it is often not possible to ensure sufficient reception quality in order to enable a motor vehicle to be operated by voice from the outside. The better the speech recognition, the more different the voice commands of a user to be implemented by the motor vehicle, for example opening the trunk, lights on, unlocking the motor vehicle, etc. Furthermore, the speech recognition should be possible in a 360° environment around the motor vehicle.

DETAILED DESCRIPTION

Figure 1A:
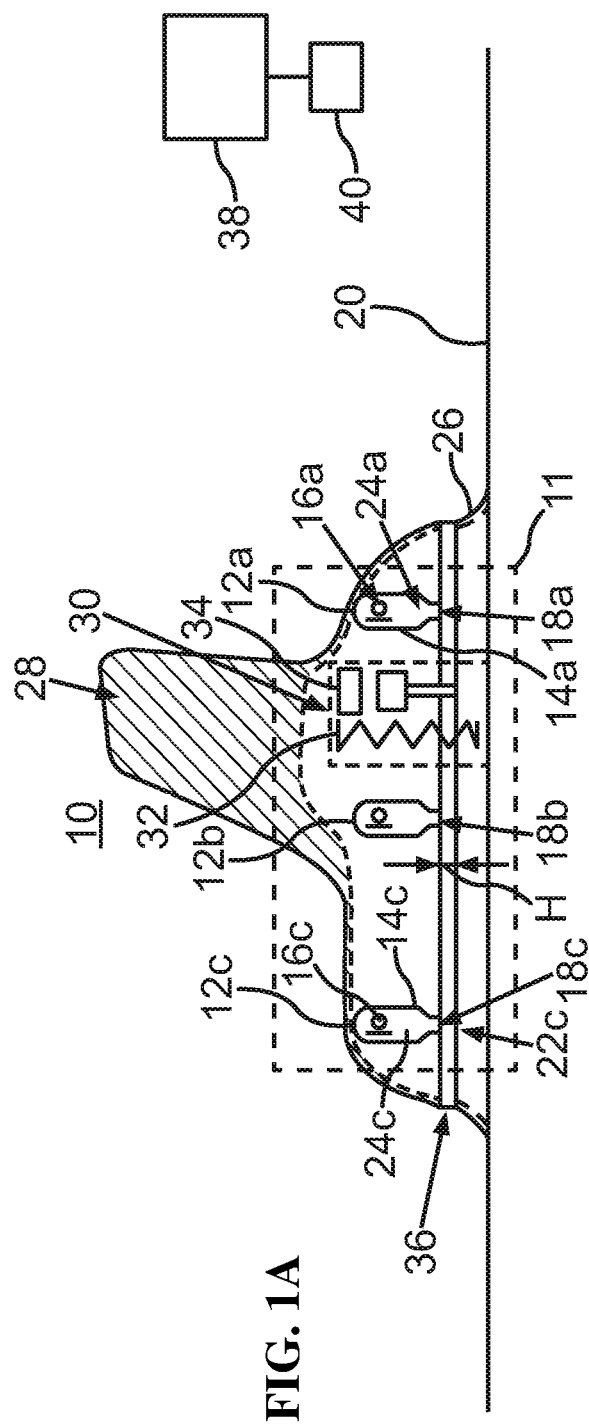
FIG. 1A is a schematic representation of a motor vehicle roof antenna with a motor vehicle external microphone in an activated state, according to some embodiments of the present disclosure.

The object of the present disclosure is therefore to provide improved voice operability of a motor vehicle from the outside.

This object is achieved by a motor vehicle external microphone, a motor vehicle roof antenna with such a motor vehicle external microphone, a motor vehicle with at least one such motor vehicle exterior microphone and by a method for operating a motor vehicle external microphone.

The present disclosure is based on the finding that a motor vehicle external microphone must accordingly be arranged in the outer region of a motor vehicle in order to detect voice commands from the voice operator. Since microphones are pressure receivers, they must have acoustic openings in order to receive the sound signals. If the openings are closed, they are protected against dust, dirt, water, snow and the like, but their reception quality drops significantly as a result. If the openings are kept open permanently, there is a risk of contamination by dust, dirt, water, snow and the like. Especially in the case of vehicles driving in the rain or if they are in a car wash, the microphones would be exposed to considerable environmental influences, would no longer meet their actual specification after being contaminated, and the beamforming algorithm and thus the speech recognition would be impaired.

The present disclosure is further based on the finding that the ability to operate the voice from the outside is essentially required when the motor vehicle is at a standstill, whereas when the motor vehicle is moving, it can be operated using voice commands in the interior of the motor vehicle using interior microphones. In this respect, it is sufficient if the openings of the microphones are only opened when a motor vehicle is stationary, whereas they are closed to protect the microphones in the moving motor vehicle. On the one hand, this makes it possible to provide excellent voice operability when the motor vehicle is at a standstill; on the other hand, the microphones are reliably protected against contamination and the like in the phase in which they are not required.

A motor vehicle external microphone according to the present disclosure therefore also has a changeover device which is designed to open the at least one microphone opening when the motor vehicle external microphone is activated and to close it when the motor vehicle external microphone is deactivated. The motor vehicle external microphone thus provides excellent reception quality for sound detection when the motor vehicle is stationary, whereas clogging of the at least one microphone opening by dirt, dust, water and the like is reliably prevented when the motor vehicle is traveling.

In some embodiments, the changeover device comprises a servomotor as the adjusting device in order to move the motor vehicle external microphone from the deactivated state to the activated state or vice versa. The motor vehicle external microphone can be set in a particularly reliable manner from the activated to the deactivated state or vice versa by means of a servomotor. By using a servomotor, the motor vehicle external microphone can be kept in the desired state without further energy consumption, that is to say without current.

In some embodiments, the changeover device can comprise at least one electromagnet device and a control device for the electromagnet device, the electromagnet device comprising a first and a second element, the first element being movably mounted relative to the second element, and one of the two elements being coupled in a stationary manner with the microphone opening, wherein the control device is designed to control the electromagnetic device such that the first and second elements attract one another in one state and/or repel one another in another state or in any case do not attract one another, in order to close and release the at least one microphone opening or vice versa. The use of an electromagnetic device provides a particularly cost-effective way of moving the external vehicle microphone from the deactivated state to the activated state or vice versa.

In both variants, the changeover device can comprise at least one spring device which is arranged in such a way that it counteracts the adjusting device. Accordingly, if the respective adjustment device is designed in such a way that the motor vehicle external microphone is brought into the activated state, the motor vehicle external microphone is reliably kept in the deactivated state by means of the spring device without any further energy requirement. For activating the motor vehicle external microphone, the spring device is accordingly preferably tensioned, so that when the motor vehicle external microphone is deactivated, it is in a more relaxed state.

According to a further aspect, the disclosure relates to a motor vehicle roof antenna having at least one motor vehicle external microphone according to the present disclosure.

In some embodiments, the motor vehicle roof antenna comprises a base body for mounting on a vehicle roof and an antenna body coupled thereto, wherein at least one element of the base body or of the antenna body, preferably the antenna body itself, can be moved by means of the changeover device. As a result of the relative movement between the base body and the antenna body, the microphone opening of at least one microphone unit can accordingly be opened or closed in order to put the motor vehicle external microphone into the activated or the deactivated state. By accommodating the motor vehicle external microphone, preferably with a multiplicity of microphone units, for example five microphone units, in the motor vehicle roof antenna, the desired 360° coverage can be provided around the motor vehicle.

Since in this case a multiplicity number of microphone units are arranged in a narrow space and are activated or deactivated at the same time, it is sufficient to provide the changeover device only once.

The changeover device is preferably designed to move the antenna body relative to the base body, so that in order to release the at least one microphone opening, at least one opening, preferably a circumferential gap, in particular a circumferential gap with a width between 1 and 3 mm, is generated between the base body and the antenna body. Each microphone opening can be assigned a separate opening or a circumferential gap for all microphone openings. The microphone opening can thus be released by a large number of microphone units by a single movement of the antenna body relative to the base body. A stroke between 1 and 3 mm is sufficient to create a sufficiently wide acoustic channel to ensure a high reception quality of speech signals.

The at least one microphone opening preferably projects into the opening between the base body and the antenna body, the microphone capsule being arranged above the opening in the installed state of the motor vehicle external microphone, the microphone housing preferably being designed to be watertight. This ensures that in a water column test in which the motor vehicle antenna is loaded with a water pressure corresponding to a 1 m high water column, the microphone capsule is not reached by the water and is therefore protected accordingly.

According to a further aspect, the present disclosure relates to a motor vehicle having at least one motor vehicle external microphone according to the disclosure, the motor vehicle having a motor vehicle outer surface having a recess in which the motor vehicle external microphone is arranged in the deactivated state, wherein the at least one microphone opening projects from the motor vehicle outer surface when the motor vehicle external microphone is activated. The motor vehicle external microphone according to the present disclosure can thus also be arranged outside the motor vehicle roof antenna. The positioning of the at least one motor vehicle external microphone can take place anywhere on the motor vehicle, depending on the parameterization of a corresponding recognition algorithm for speech recognition.

A part of the motor vehicle external microphone is preferably moved out of the vehicle exterior surface by means of the changeover device, in particular by 1 to 3 mm, in order to put the motor vehicle external microphone into the activated state. To deactivate the vehicle external microphone is sunk again into the recess of the vehicle exterior surface. This protects the microphone when it is deactivated. The CW value of the motor vehicle is therefore not adversely affected by a motor vehicle external microphone according to the present disclosure.

The motor vehicle preferably comprises a control device, the control device being designed to put the at least one motor vehicle external microphone into the activated state when a locking of the motor vehicle is ascertained. In this way, the motor vehicle external microphone is activated exactly when it is needed, namely when the motor vehicle is at a standstill. A manual activation of the motor vehicle external microphone, which can also be easily forgotten, is therefore not necessary.

In this context, the control device is preferably designed to put the at least one motor vehicle external microphone into the deactivated state, at least when a motor vehicle is started. Since it can be assumed that the motor vehicle is moved after starting, this is exactly the right time to automatically deactivate and thus protect the motor vehicle external microphone. Since, as mentioned, this is linked to the starting of the motor vehicle, a user of the motor vehicle need not manually deactivate the motor vehicle external microphone, which can easily be forgotten.

The control device is preferably designed to put the at least one motor vehicle external microphone into the deactivated state after a predetermined period of time after the motor vehicle has been locked, the control device being designed to put the at least one motor vehicle external microphone back in the activated state when an authorized user approaches a predetermined threshold value. In this way it is ensured that the microphone openings, if the motor vehicle is in the idle state for a long time, are not undesirably unprotected for a long time. The approach of an authorized user can, for example, be detected on the motor vehicle side via a mobile terminal, in particular a smartphone carried by the user. Appropriate NFC techniques, in particular Bluetooth Low Energy, can be used to initialize the microphone availability in good time, so that the vehicle's external microphone is ready for use when the user is at a voice-operable distance from the vehicle. In this way, the microphone openings are only open for the actually relevant period.

The motor vehicle may further comprise at least one sensor device, which is designed to ascertain whether the motor vehicle has been parked and locked in a car wash, the at least one sensor device being coupled to the control device and the control device being designed, when a parking position and locking of the motor vehicle is ascertained, to deactivate the at least one motor vehicle external microphone in a washing system and/or leave it in the deactivated state. In this way, the microphone openings are protected from the enormous water pressures that occur at a car wash, even if the vehicle has an automatic activation mechanism, see above. In particular, a rain sensor, a camera device or a positioning system, for example a GPS-based navigation system, can function as the sensor device. This makes it possible to reliably ascertain that the motor vehicle is in a car wash and that the at least one motor vehicle external microphone must be put into the deactivated state for its protection.

The preferred embodiments presented, according to some embodiments of the present disclosure, with reference to the motor vehicle external microphone, the motor vehicle roof antenna and the motor vehicle and their advantages apply accordingly, insofar as applicable, to the method for operating a motor vehicle external microphone.

Exemplary embodiments of the present disclosure will now be described in more detail below with reference to the accompanying drawings.

Figure 1B:
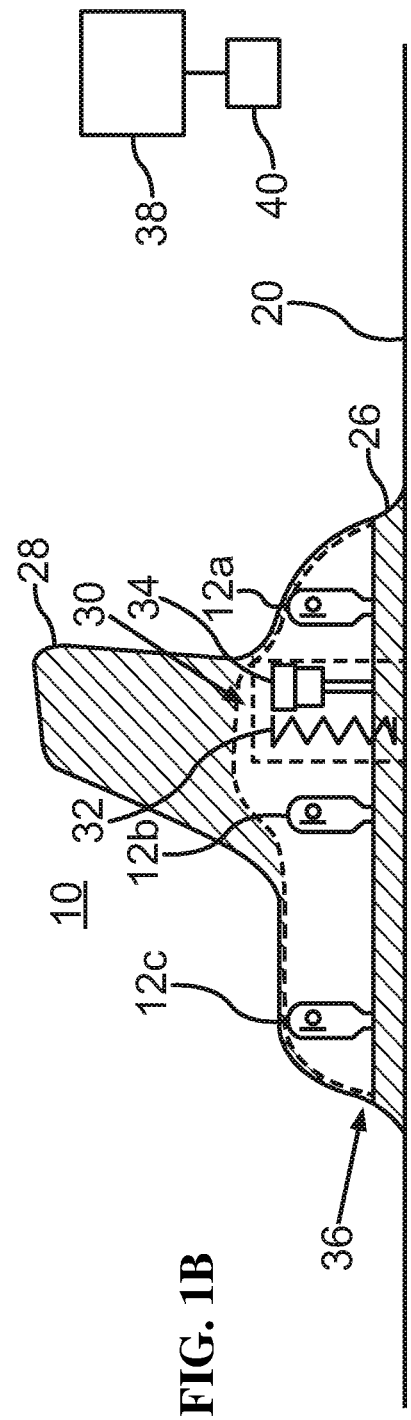
FIG. 1B is a schematic representation of a motor vehicle roof antenna with a motor vehicle external microphone in a deactivated state, according to some embodiments of the present disclosure.

FIGS. 1A and 1B show schematic representations of a motor vehicle roof antenna 10 according to some embodiments of the present disclosure, with FIG. 1A showing the motor vehicle roof antenna 10 with the motor vehicle external microphone 11 activated and FIG. 1B with the motor vehicle roof antenna 10 with the motor vehicle external microphone 11 deactivated. The motor vehicle external microphone 11 in the present case comprises a plurality of microphone units 12a to 12c, each with a waterproof housing 14, in the upper region of which, i.e. in an opening 18 diametrically opposite the side of the housing 14, a microphone capsule 16 is arranged. The opening 18 is oriented in the direction of the vehicle roof 20 and is preferably provided with a water-impermeable and wind-protecting membrane 22 in order to protect the microphone capsule 16 in the event of rain or wind, even when the motor vehicle is stationary. An acoustic channel 24 is formed between the opening 18 and the microphone capsule 16.

The motor vehicle roof antenna 10 comprises a base body 26 which is fastened on the vehicle roof 20. The base body 26 forms an antenna base and an inner antenna body. The microphone units 12 and further electronics are located here. The motor vehicle roof antenna 10 further comprises an antenna body 28 which is mounted so as to be movable relative to the base body 26. In the present case, the antenna body 28 has a fin shape. For the purpose of relative movement, a changeover device 30 is provided, which in the exemplary embodiment shown comprises a spring device 32 and an electromagnet 34 with two interacting elements. The upper element of the electromagnet 34 in the illustration is fixedly connected to the antenna body 28, while the lower element of the electromagnet 34 is fixedly connected to the base body 26. In the present case, a single changeover device 30 is used to switch each microphone unit 12a to 12c. In other words, the motor vehicle external microphone 11 in the present case comprises a plurality of microphone units 12a to 12c.

FIG. 1A shows the state when the motor vehicle external microphone 11 is activated, which can be recognized from the fact that the antenna body 28 has moved away from the base body 26 to form a gap 36 which has a width H. This is achieved in that the electromagnet 34 is not energized, the spring device 32 being designed such that it presses the antenna body 28 away from the base body 26 when the electromagnet 34 is not energized. In order to ensure a fixed width H of the gap 36, limiting elements (not shown) are provided which limit the relative movement of the antenna body 28 with respect to the base body 26.

The openings 18 of the microphone units 12 open into the gap 36. Although a circumferential gap 36 is shown here, individual openings in the area of the microphones 12 are also sufficient so that these can be opened and closed.

FIG. 1B shows the state when the motor vehicle external microphone 11 is deactivated. This state is achieved by energizing the electromagnet 34. As a result, the antenna body 28 is moved toward the base body 26 while the gap 36 is closed. At the same time, the spring device 32 is tensioned. The openings 18 of the microphone units 12 are closed.

As an alternative to the changeover device of FIGS. 1A and 1B, a servomotor can also be provided in order to open and close the circumferential gap or the openings.

A control device 38 is designed to put the motor vehicle external microphone 11 into the activated state when a locking of the motor vehicle is ascertained. When the starting of the motor vehicle is ascertained or when it is determined that the motor vehicle is moving or the ignition is switched on, the motor vehicle external microphone 11 is put into the deactivated state.

The control device 38 can be designed to put the motor vehicle external microphone 11 into the deactivated state after a predetermined period of time after the motor vehicle has been locked, the control device 38 being designed to put the motor vehicle external microphone 11 back into an activated state when an authorized user approaches a predefined threshold value. The stroke H is preferably between 1 and 3 mm. The stroke should be as small as possible so that the openings 18 are protected against environmental influences even when the vehicle is stationary. A small stroke H is also to be aimed at for a gap 36 that is as inconspicuous as possible in terms of design. Due to the passive spring action, no quiescent current is consumed when the vehicle is parked in order to keep the gap 36 open.

The vehicle may include a sensor device 40 that is configured to determine whether the motor vehicle has been parked and locked in a car wash. The sensor device 40 is coupled to the control device 38, the control device 38 being designed to deactivate the motor vehicle external microphone 11 and/or to leave it in the deactivated state when the motor vehicle is found to be parked and locked in a car wash.

Figure 2:
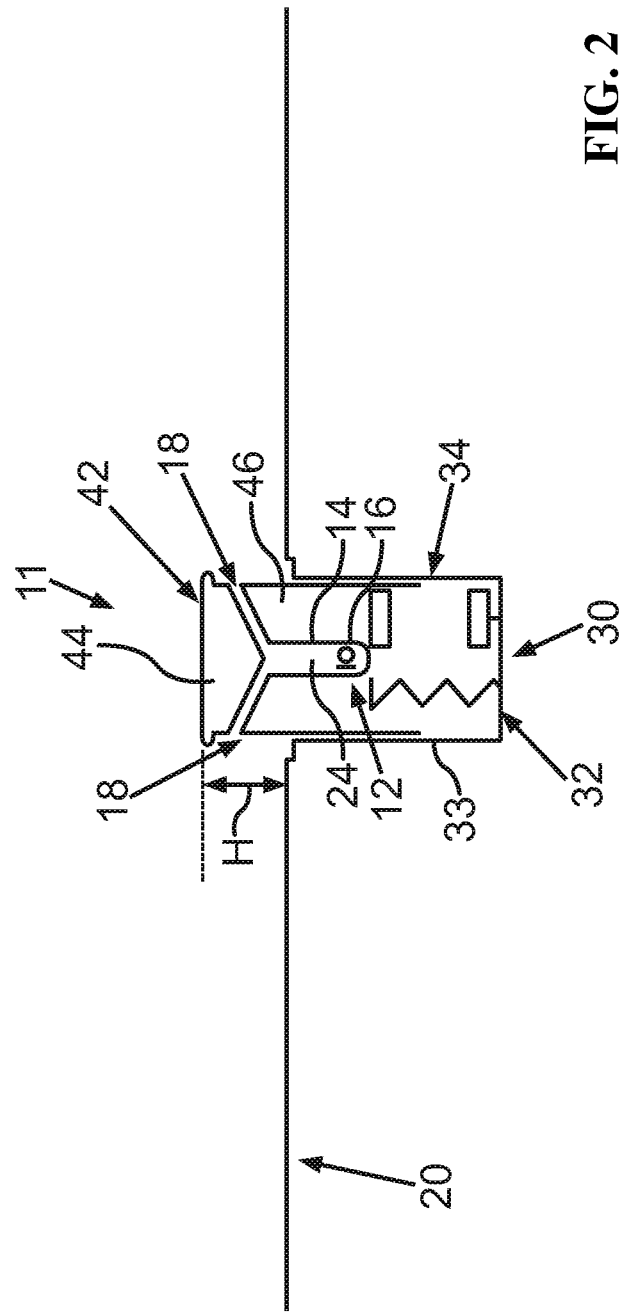
FIG. 2 is a schematic representation of a further embodiment of a motor vehicle external microphone according to the invention.

FIG. 2 shows a further embodiment. This exemplary embodiment is characterized in that the motor vehicle external microphone 11 comprises a movable cylinder 42, which in turn comprises a microphone unit 12 and a changeover device 30. The movable cylinder 42 is arranged in a recess 33 in a vehicle surface, for example the vehicle roof 20.

Without energizing the electromagnet 34, the spring device 32 presses the upper part of the movable cylinder 42 out of the vehicle surface 20. This opens the openings 18 of the microphone 12. If the upper part 44 of the displaceable cylinder 42 is coupled to the lower part 46 only by means of support devices, the opening 18 can be designed to run essentially over 360°, so that reception with the motor vehicle external microphone 11 is possible in essentially all spatial directions. The lower element of the electromagnet 34 in the illustration in FIG. 2 is fixed in the vehicle, the upper element in the cylinder 42. The same applies to the spring device 32. The cylinder 42 preferably has a diameter between 5 and 15 mm.

Such displaceable cylinders 42 can be provided at any points on the vehicle surface 20.

The invention claimed is:

1. A motor vehicle roof antenna, comprising:
 a motor vehicle external microphone, comprising:
  a microphone unit, comprising:
   a microphone capsule arranged in a microphone housing, wherein the microphone housing comprises a microphone opening, through which an acoustic channel is formed between the microphone opening and the microphone capsule; and
a changeover device configured to:
release the microphone opening in an activated state of the motor vehicle exterior microphone; and
close the microphone opening in a deactivated state of the motor vehicle external microphone;
a base body for mounting on a vehicle roof; and
an antenna body coupled to the base body, wherein at least one element of the base body or the antenna body is movable by the changeover device.

2. The motor vehicle roof antenna according to claim 1, wherein the changeover device comprises a servomotor as an adjusting device configured to move the motor vehicle external microphone from the deactivated state to the activated state or vice versa.

3. The motor vehicle roof antenna according to claim 2, wherein the changeover device comprises a spring device arranged to counteract the adjusting device.

4. The motor vehicle roof antenna according to claim 1, wherein the changeover device comprises:
an electromagnetic device, comprising a first element and a second element movable relative to each other, wherein
the first element is mounted on the second element; and
the first element or the second element is coupled in a stationary manner to the microphone opening; and
a control device configured to control the electromagnetic device such that the first element and the second element attract each other in a first state, and repel or do not attract each other in a second state, in order to close or release the microphone opening.

5. The motor vehicle roof antenna according to claim 1, wherein the changeover device is configured to move the antenna body relative to the base body so that an opening between the base body and the antenna body is provided to expose the microphone opening by a width in a range between 1 mm and 3 mm.

6. The motor vehicle roof antenna according to claim 5, wherein the opening between the base body and the antenna body is a circumferential gap.

7. The motor vehicle roof antenna according to claim 5, wherein the microphone opening projects into the opening between the base body and the antenna body, and the microphone capsule is installed above the opening between the base body and the antenna body.

8. The motor vehicle roof antenna according to claim 7, wherein the microphone housing is watertight.

9. A motor vehicle, comprising
a motor vehicle external microphone, comprising:
a microphone unit, comprising:
a microphone capsule arranged in a microphone housing, wherein the microphone housing comprises a microphone opening, forming an acoustic channel between the microphone opening and the microphone capsule; and
a changeover device configured to:
release the microphone opening in an activated state of the motor vehicle exterior microphone; and
close the microphone opening in a deactivated state of the motor vehicle external microphone;
a motor vehicle outer surface with a recess, wherein
the motor vehicle external microphone is arranged in the recess in the deactivated state; and
the microphone opening projects from the motor vehicle outer surface in the activated state; and
a control device configured to put the motor vehicle external microphone into the activated state when the motor vehicle is locked.

10. The motor vehicle according to claim 9, wherein the control device is configured to put the motor vehicle external microphone into the deactivated state when the motor vehicle is started.

11. The motor vehicle according to claim 9,
wherein the control device is configured to put the motor vehicle external microphone into the deactivated state after a predetermined period of time after the motor vehicle is locked; and
wherein the control device is configured to put the motor vehicle external microphone back into the activated state when an authorized user is approaching the motor vehicle within a predeterminable threshold value.

12. The motor vehicle according to claim 9, further comprising:
a sensor device coupled to the control device, wherein
the sensor device is configured to ascertain whether the motor vehicle is parked and locked in a car wash; and
the control device is configured to deactivate the motor vehicle external microphone and/or to leave it in the deactivated state if the motor vehicle is parked and locked in the car wash.

13. A method for operating a motor vehicle roof antenna having a motor vehicle external microphone, comprising:
releasing a microphone opening by moving at least one element of a base body of the motor vehicle roof antenna or an antenna body of the motor vehicle roof antenna to activate the motor vehicle external microphone; and
closing the microphone opening by moving at least one element of the base body or the antenna body to deactivate the motor vehicle external microphone, wherein
the microphone opening and a microphone capsule arranged in a microphone housing form an acoustic channel of the motor vehicle external microphone;
the base body is mounted on a vehicle roof;
the antenna body is coupled to the base body; and
at least one element of the base body or the antenna body is movable.

\* \* \* \* \*